United States Patent

Fontan et al.

[15] 3,636,688
[45] Jan. 25, 1972

[54] APPARATUS FOR PICKING GRAPES

[72] Inventors: Andre Fontan, 11, rue Nationale, Nogaro; Rene Benac, Avenue Saint Roch, Mirande, both of France

[22] Filed: Nov. 10, 1969

[21] Appl. No.: 875,470

[30] Foreign Application Priority Data

Nov. 12, 1968 France..........................................1283
Oct. 21, 1969 France..........................................6936001

[52] U.S. Cl..................................................56/330
[51] Int. Cl..................................................A01g 19/00
[58] Field of Search..........................................56/328, 330

[56] References Cited

UNITED STATES PATENTS

| | | | |
|---|---|---|---|
| 2,471,326 | 5/1949 | Hoyt, Sr. | 56/328 UX |
| 3,164,942 | 1/1965 | Middlesworth et al. | 56/328 |
| 3,439,482 | 4/1969 | Orton | 56/330 |
| 3,473,311 | 10/1969 | Fox | 56/330 |
| 3,483,687 | 12/1969 | Tanner, Jr. | 56/328 |
| 3,514,936 | 6/1970 | Grover | 56/330 |

Primary Examiner—Louis G. Mancene
Assistant Examiner—J. A. Oliff
Attorney—Charles E. Baxley, Frank M. Nolan, Thomas E. Tate and Liddy, Sullivan, Hart, Daniels & Baxley

[57] ABSTRACT

A mobile grape harvester for straddling vines. Batteries of needles are reciprocated horizontally to impact the grapes and thereby disengage them. Spacing of the needles sufficiently close to each other assures that each grape is impacted. The striking force of each needle is limited and the needles are organized to recoil so that grapes are dislodged but vines and supports are not damaged. A grape-receiving arrangement is positioned below the battery of needles and it seals automatically about the stocks of the grape vines. The grape-receiving arrangement includes a conveying system to transport the grapes.

7 Claims, 6 Drawing Figures

PATENTED JAN 25 1972  3,636,688

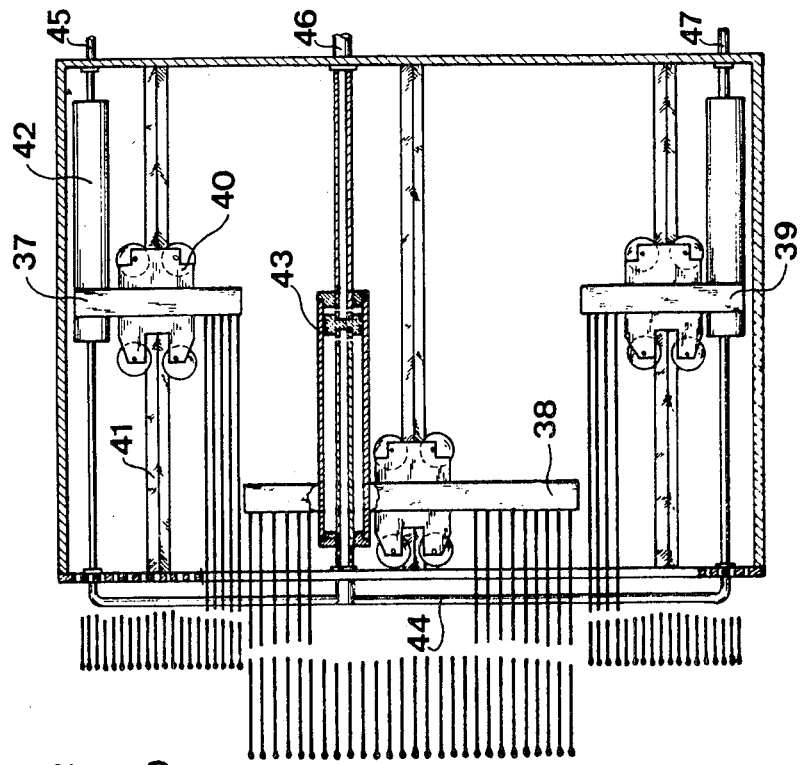
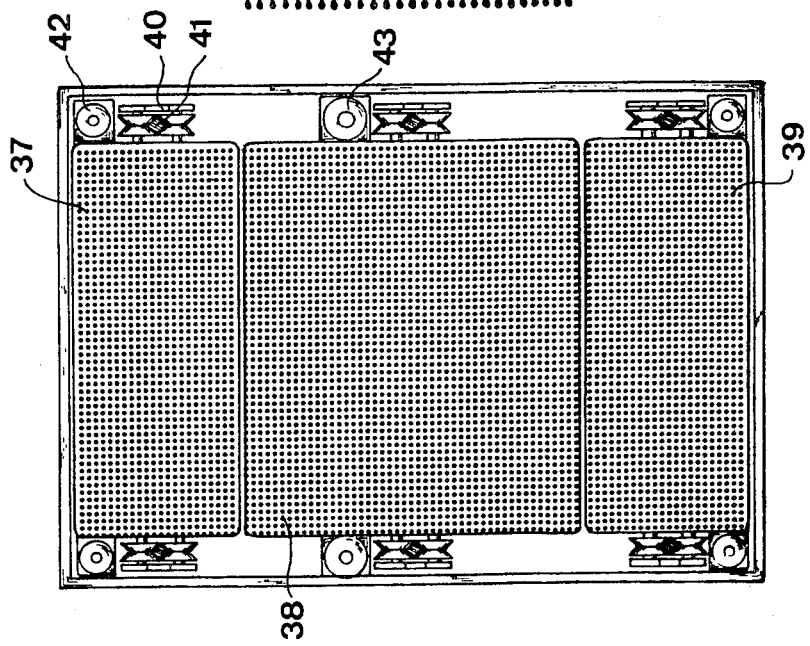
FIG. 6
FIG. 5

3,636,688

APPARATUS FOR PICKING GRAPES

INVENTION

This invention relates to an automatic grape-picking method as well as a grape-picking machine especially suited to carrying out said method.

Very few automatic grape-picking machines are known and the few machines developed up to the present time, for instance pneumatic or vibrating machines, give only disappointing results and are difficult to operate. In all cases, the picking of grapes by these machines is incomplete and 30 to 40 percent of the grapes are not harvested.

Furthermore, there are known machines having vibrating cutting bars which cut the stalk of the bunches of grapes; however, these machines are adapted only to vineyards with special staking, by which all the bunches of grapes are at the same height. This limitation considerably reduces the value of these machines to the extent that they cannot be used in most cases.

The purpose of the present invention is to provide a new method of harvesting grapes by at least partial picking of the grapes from the stalks and to provide an automatic grape-picking machine which can be used in all cases. The method in accordance with the invention consists in imparting to a plurality of needles (which are substantially parallel and located close to each other) a reciprocating movement transverse to the vine to be picked; in accordance with this method, the striking force of the needles is limited to a given value so that each needle can by impact detach the grapes which it encounters on its passage and be stopped, without damage, by an obstacle such as a vine stock or post.

Such a method affords the advantage of effecting a complete harvesting without leaving a single grape on the bunch. As a matter of fact, the needles, of which there are several thousand, have a density per unit of surface which is so designed that a grape cannot pass between two needles; each grape is therefore struck by a needle which detaches it. In certain cases, the picking of the grapes is merely partial and the impact of several needles on the grapes of one and the same bunch is sufficient to break the stem of said bunch which is thus detached.

This method has furthermore the advantage of not requiring the presence of a compressor, as is necessary for the pneumatic machines which thereby are difficult to operate.

The assembly of needles is displaced parallel to the rows of vines so as to sweep all the vines. The height at which the comb (thus formed by the assembly of the said needles) operates is adapted to the type of vineyard to be harvested in such a manner that not a single grape escapes the sweeping of the needles either below or above.

In accordance with a preferred embodiment of the method in accordance with the invention, the reciprocating of the needles is produced, simultaneously for all of the needles, by, for instance a supporting frame which is imparted the said movement; the limitation of the striking force of the needles is then produced individually for each needle by elastic means with which each of them is provided. Thus the assembly of needles is imparted one and the same movement; those needles which, not encountering any obstacle or encountering a grape, have to overcome a resistance less than their striking force will continue their path after having, where applicable, detached the said grape; on the other hand, the needles which encounter an obstacle, for instance, a stock, a vine stake, etc., will have to overcome a resistance greater than their striking force and will therefore be stopped without being damaged by said obstacle.

The invention also relates to a grape-picking machine which is intended to permit the carrying out of the method described above. In accordance with the invention this machine comprises:

A frame to which there is fastened a plurality of needles which are substantially parallel to each other;

means for driving said frame in an alternate reciprocating movement having a direction which is approximately parallel to the longitudinal direction of the needles;

elastic retractability means capable of making the point of each needle retractile when a resistance greater than a given value opposes its advance;

means for receiving the grapes, which means are located below the needles and cover a given area so as to receive all the grapes detached.

In accordance with a first embodiment, the needles are fastened to the frame by means of perforations in the latter through which they pass, while the elastic retractability means consist for each needle of an elastic member fastened at one end on the frame and at the other end on an extension of the needle at the rear of the frame; the said needle is then provided on this extension with a stop intended to come against the edge of the perforations of the frame under the action of the said elastic member.

This elastic member may, for instance, be a spring, an elastic wire or a pneumatic dashpot. It is therefore evident that as long as the resistance encountered by the needle remains less than the return force of said elastic member, the latter will apply the said stop against the frame and therefore the movement of the needles will be that of the frame, that is to say, a reciprocating movement. On the other hand, if this resistance becomes greater than this return force, the said member will be unable to maintain the needle immovable with respect to the frame and the elasticity of said member entering into action, the needle will be stopped by the obstacle encountered.

In accordance with another embodiment, each needle is fastened to the frame via a collar of elastic material, while the length of said needles and the material of which they are formed are such as to impart them a given ability to flex.

In the event that the needle encounters a resistant obstacle, the said collar has the possibility of deforming, permitting the base of the needle to effect changes in orientation and possibly longitudinal deformation, which changes in orientation and longitudinal deformation are caused by the push of the needle. Furthermore, the needle itself can deform by flexing; due to these arrangements, the obstacle stops the point of the needle without damaging it.

The machine is preferably equipped with a grid in a plane parallel to that of the frame, the needles in the extreme retracted position of the frame being all located to the rear of said grid, which makes possible, through the free spaces present in the grid, the passage of the said needles upon their forward movement. This grid will make it possible to eliminate stalks or other foreign bodies which the needles may collect during each movement.

Furthermore, the needles may be provided advantageously at their free end with a tip of given shape adapted to the type of vineyard to be harvested. Upon the blow against the grape, it is this tip which will come into contact with the grape without the latter being pierced or damaged.

Furthermore, the drive means for the frame may consist of a motor capable of moving a set of connecting rods connected to the said frame. These means may also be hydraulic; they will then preferably consist of a set of double-acting jacks, possibly associated with jacks intended to drive balancing masses which may be provided to eliminate the vibrations of the said machine. We will see further below, however, that certain arrangements make these masses unnecessary.

In accordance with a preferred embodiment, the means for receiving the detached grapes consist of a receptacle which is divided into two half receptacles capable of being arranged on opposite sides of the vine stock, the edges of these half receptacles which are to be located opposite each other near the stalk being each provided with an ascending elastic skirt capable of deforming in contact with the said stock and fitting itself to the contours thereof.

The detached grapes will drop into these half receptacles without escape therefrom being possible, since they cover continuously the area located below the stalk. The elasticity of the said skirts permits the displacement of the two half receptacles at the same time as the grape-picking comb. We may note that the needles can project the grapes with a certain lateral speed; the half receptacle opposite the comb will therefore have walls which are relatively high so that all the grapes are collected.

Furthermore, blow means may subsidiarily be provided associated with the receptacle in order to eliminate the foreign matter, such as vine leaves, which might fall into it. Of course, the blowing power of these means is limited so as not to eject the grapes.

Furthermore, the grape-picking machine in accordance with the invention is advisedly equipped at its upper part with pivot means which make it possible to suspend the said machine from a supporting device, for instance, a straddle tractor. The grape-picking machine is thus caused to advance along the rows of vines, automatically and rapidly effecting the picking of the vines and requiring only a single person for its operation. The considerable value of this machine is thus evident.

In order to avoid the presence of balancing masses, the frame to which the needles are fastened may be divided into several independent frames which are capable of being imparted reciprocations which are out of phase with each other. There are preferably three superimposed frames. The central frame has two times more needles than each of the two others and covers twice the area; this central frame is then imparted a movement in phase opposition with respect to the other two frames which are driven in phase. Thus the central frame has a mass equal to the sum of the masses of the other two frames and therefore since its movement is in phase opposition with respect to them, the machine is balanced from a dynamic standpoint (at least with respect to the component of first order of the vibration, certain harmonics of lower order possibly subsisting).

Furthermore (and this advantage is essential) the arrangement described above makes it possible to limit to the utmost the shaking of the vine caused by the striking of the needles, since half of these needles have a movement in phase opposition with respect to the other half.

The machine in accordance with the invention may furthermore (in order further to increase its effectiveness) have two assemblies of needles provided in substantially horizontal direction; the needles of the first assembly are located opposite, with respect to the vine, the needles of the second assembly. One of the assemblies can operate on one half of the depth of the vines, while the other can operate on the other half. In order not to hit the grapes back, these two assemblies will preferably be staggered along the row of vines.

In this case, the half receptacles for the recovery of the grapes will advantageously be provided at their bases with a guide shoe mounted on elastic means, which makes possible by resting against the vine stock, the centering of the machine and of its two assemblies of needles.

Other characteristics, purposes and advantages of the invention will become evident from the following description, read with reference to the accompanying drawings, said description and drawings being given solely by way of illustration and not of limitation. In the drawings:

FIGS. 5 and 6 are a front view in section and a side view in section respectively of another embodiment of a machine in accordance with the invention.

Figure 1:
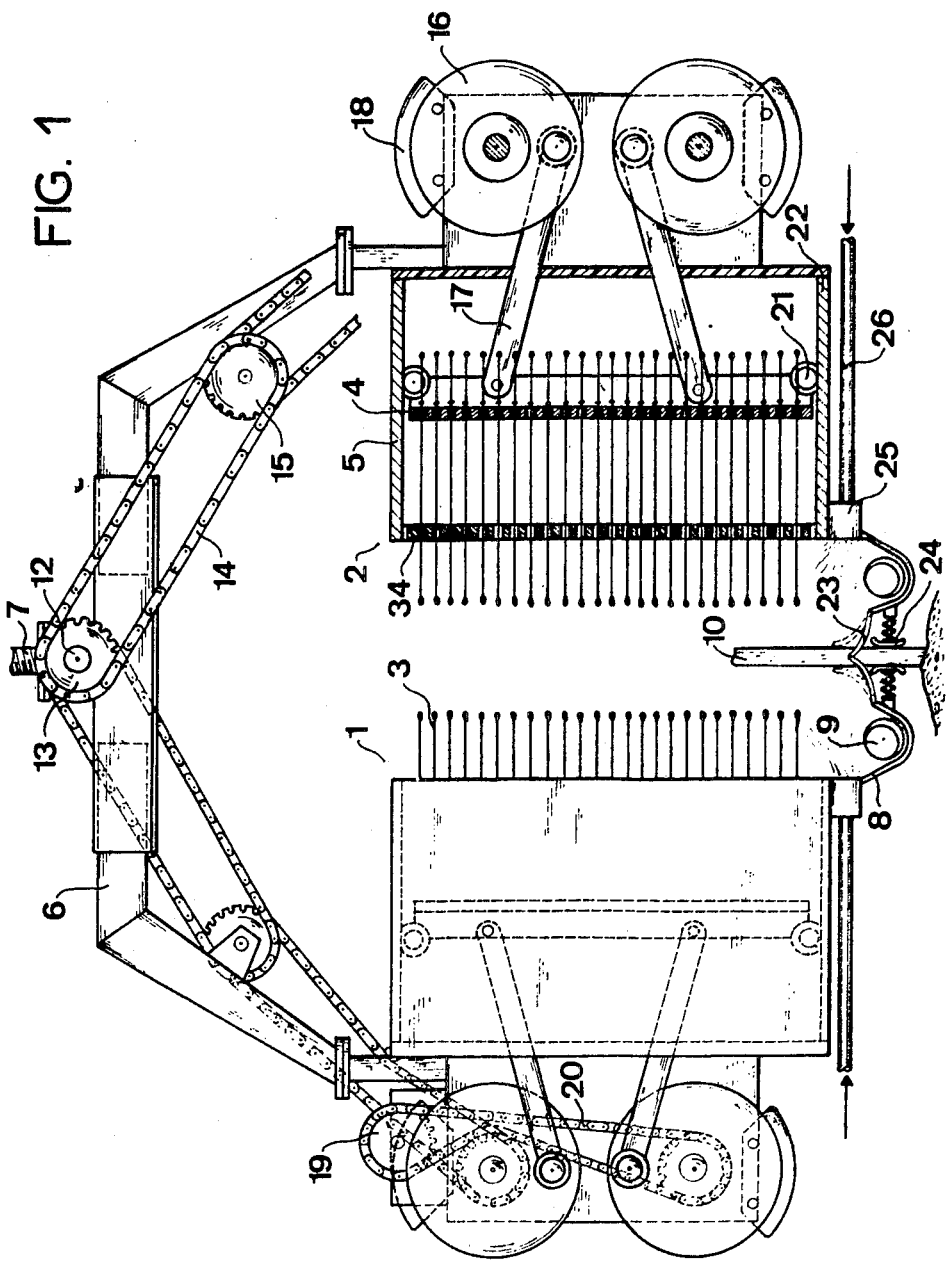
FIGS. 1 and 2 show in side and top view respectively an embodiment of a machine in accordance with the invention; these figures are divided into a left-hand half view not shown in section and a right-hand half view with regard to which a part of the device is shown in section.
Figure 2:
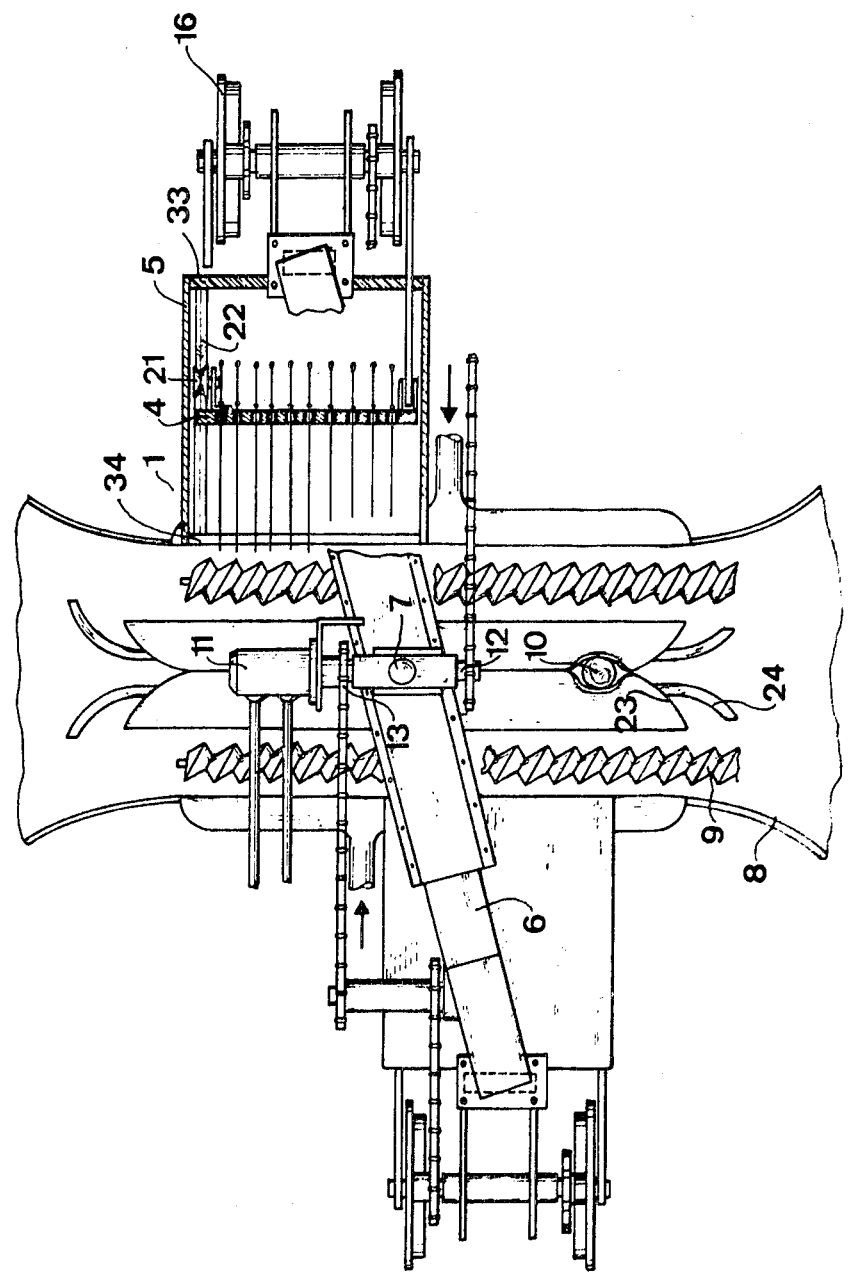

A grape-picking machine (FIGS. 1 and 2) consists essentially of the following members:

Two assemblies 1 and 2 of needles such as 3 fastened to two rectangular frames such as 4 and located within housings such as 5;

a telescopic connecting arm 6 which connects the housings 5 which are arranged symmetrically with respect to a fastening screw 7 provided on said arm;

means for driving the frames 4 in horizontal reciprocation;

two half receptacles of elongated shape such as 8 for the recovery of the grapes, each of them having a worm 9 intended to carry the grapes towards a hopper, not shown.

Before detailing more precisely these devices, there will be indicated the function of each by explaining the general operation of the machine; the latter may be suspended by means of the screw 7 from an articulation knuckle of a straddle tractor. The said machine is arranged in such a manner that a row of vines symbolized by stock 10 comes between the two assemblies 1 and 2 which are therefore staggered with respect to each other along said row. The grape-picking machine is slowly moved parallel to this row by the straddle tractor; the drive means then impart a reciprocating movement to each of the frames 4 within the housings 5. The needles (made retractile, as we will see below) are therefore caused to penetrate into the vine; these needles are sufficiently close to each other and sufficiently numerous so that all the grapes are struck and detached. In case of an obstacle in the passage of a needle, the latter is simply stopped without damage due to its retractability. The grapes which have been detached drop into the half receptacles 8 and are carried along towards the hoppers by the endless screws 9.

One will therefore understand the value of the machine in accordance with the invention which makes it possible to effect rapidly and completely the picking of the grapes from the vines without special staking, nor prior preparation. The components and accessories of this machine are described in detail below.

The telescopic arm 6 makes it possible to vary and regulate the distance between the two assemblies 1 and 2 so as to adapt said distance to the type of vines to be harvested. This telescopic arm has at its upper portion a hydraulic motor 11 which drives a pin 12 and pinions such as 13. These pinions 13 are connected by means of chains such as 14 to relay pinions such as 15, of which there are two, one located on one side and the other on the other side of the arm, and corresponding to each of the assemblies 1 and 2.

Each relay pinion 15 transmits the movement of rotation to wheels such as 16. These wheels 16, of which there are four for each assembly 1 or 2, are grouped in coaxial pairs, the wheels of one pair being placed above the wheels of the other. Connecting rods such as 17 are connected at one end to one of the wheels 16 and at the other end to the frame 4.

In order to balance the mechanical assembly which is thus formed, the wheels 16 have, opposite the points of connection of the connecting rods 17, balancing masses 18; furthermore two superimposed wheels turn in opposite direction to each other, the position of the rods being at each instance symmetrical with respect to the horizontal plane equidistant between the two wheels. The opposite movement of rotation of two superimposed wheels is obtained by means of a supplementary pinion 19 and a chain 20 arranged in the manner shown in FIG. 1.

Thus each frame 4 is imparted by four connecting rods 17 a reciprocating motion in the housing 5. These frames are mounted on rollers such as 21 which are capable of moving on rails such as 22.

Furthermore, the half receptacles 8 for the collection of the grapes which have been detached are each provided on their edge with an elastic skirt 23 which is capable of deforming in contact with the vine stocks and snugly fitting the shape of the stock.

At their base each of these half receptacles has a guide shoe 24 mounted on springs. The shoes 24 of elongated shape are intended to rest against the vine stocks and thus properly to center the machine so that the two needle assemblies are substantially symmetrical with respect to the row of vines. These shoes are provided with curved ends which enable them to move progressively apart upon coming into contact with the vine stocks.

Furthermore, each half receptacle 8 is provided above it with a blow nozzle 25 which, by means of conduits 26 and a blower (not shown), makes it possible to produce above these receptacles a flow of air capable of eliminating foreign bodies such as vine leaves which might fall into these half receptacles.

Figure 3:
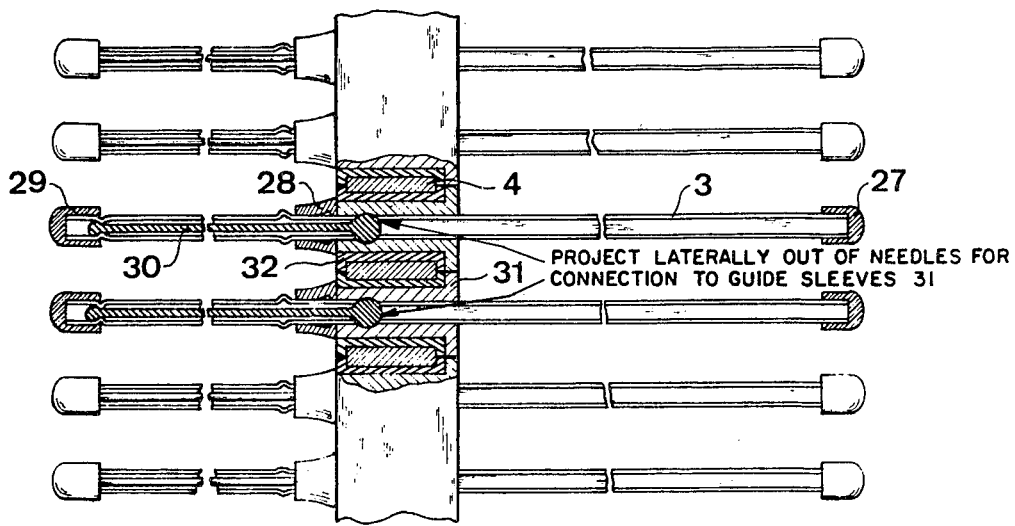
FIG. 3 is a detail view in section of a needle frame intended for a machine in accordance with the invention.

FIG. 3 is a section through the frame 4. The needles 3 shown in this figure are composed of a metal rod having a U-shaped cross section opened toward the viewer In the example described, these needles have at their front end tips 27 which enable them, upon impact against the grape, not to damage the latter. These needles are extended, to the rear of the frame through which they pass, by a rear portion provided with a stop 28 and a cap 29 at its end. This part comprises, in the hollowed center of its profile, an elastic word 30 which is fastened on the one end in the cap 29 due to a slight clamping of the flanges of the end of said needle fastened and on the other end to frame 4 by means of a widened end which projects laterally outward of the needle for connection to guide sleeve 31 which is fastened in turn to the frame 4. The attachment of the needles can be made more flexible by providing between the sleeve 31 and the frame 4 a ring of elastic material 32.

This description makes it possible to understand the manner of operation of these needles; when no obstacle presents itself, the elastic wire 30 pulls the stop 28 against the guide sleeve 31 and therefore the needle 3 is in its normal position in the frame and moves in the same manner as the latter. On the other hand, when a resistance greater than the return force of the elastic wire 30 acts on the tip 27 of the needle, the elastic wire 30 stretches and the needle 3 is stopped, while the frame continues its stroke. The provisions described therefore make it possible to detach the grapes without causing damage in case of the encountering of an obstacle such as a stake or vine stock.

It should be noted that the rear face of each housing 5 is stuffed with a plate of flexible material 33 against which the caps 29 of the rear parts of the needles can strike in the retracted position of the frame. This flexible padding avoids the needle retracting by inertia at the end of each rearward stroke of the frame.

Furthermore, the front of each housing 5 is composed of a grid 34. This grid is formed of horizontal bars between which the needles can move. At the end of the rear stroke of the frame, all the needles are located at the rear of said grid which in this way retains the stems or other matter which has possibly been carried along by the said needles. The bars of this grid have been provided horizontal, that is to say, parallel to the direction of continuous advance of the machine, so that the needles do not strike against them during said advance.

Figure 4:
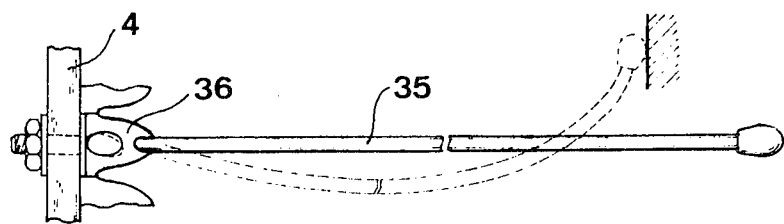
FIG. 4 is a detail view of a needle fastened to a frame by means different from those of FIG. 3 and deformation thereof.

FIG. 4 shows a needle 35 which may be cylindrical and which is fastened to the frame in accordance with another method of attachment. This needle is made of a flexible material, for instance a synthetic material, and is fastened to the frame by means of an elastic collar 36 capable of deforming by thrust of the needle. Thus, in case of an obstacle, this needle will simply bend, this flexing being facilitated by the elasticity of the collar 36 which permits changes in orientation of the base of the said needle.

FIGS. 5 and 6 are partial front and profile sections of another embodiment of the invention. In each housing the single frame already described has been replaced by three separate frames 37, 38 and 39. The upper frame 37 has a number of needles equal to one-fourth of the total number of the three frames and is fastened to two carriages such as 40 capable of traveling along rails such as 41.

The lower frame 39 is identical with the upper frame 37.

The central frame 38 covers a surface which is two times larger than that of each of the frames 37 or 39 and has two times more needles than each of them. It is also fastened to two carriages which make it possible to displace it in horizontal translation.

The frames 37 and 39 are each equipped with two jackets such as 42 with traversing rod. It should be noted that it is possible to reduce the number of these jacks to a single one due to the effective guiding by carriages and rails. These frames are rigidly connected with the cylinders of the jacks, while the rods thereof are fastened to the front and the rear of the housing respectively by means of brackets and straps provided for this purpose.

The central frame 38 is itself equipped with two jacks such as 43 of a capacity equal to twice that of the jacks 42. The jacks 42 and 43 are connected by conduits such as 44 so that the frames 37 and 39 are driven in phase and the frame 38 in phase opposition with respect to them.

In 45, 46 and 47 there can be noted the inlet and outlet conduits for the driving fluid which in the example indicated consists of oil. This oil flows in the same direction in the conduits 45 and 47 and in an opposite direction in the conduit 46. These oil circulations driven by a hydraulic motor can be controlled by a system of slide valves, a set of solenoid valves or any other arrangement.

The needles fastened to the frames 37, 38 and 39 have a retractile point such as shown in FIG. 3 or in FIG. 4.

The other arrangements relating to this hydraulic embodiment are similar to those provided for the embodiment with connecting rods and will therefore not be described.

The essential advantage of the hydraulic system is that it is lighter, more flexible and of simpler construction. The provision of three frames as described makes it possible to achieve a dynamically balanced assembly. Furthermore, this arrangement considerably reduces the shaking of the vine caused by the striking of the needles.

Of course, the invention is by no means limited to the examples described and shown; it is capable of numerous variants depending upon the applications in view without thereby going beyond the scope of the present invention. Thus the description has been directed essentially to a grape-picking machine; one could, however, conceive on basis of this of machines capable of effecting other harvestings. It will be sufficient to adapt the dimensions of the various parts and the density of the needles to the product to be harvested.

In the same manner, one could contemplate a machine which, instead of attaching the vine laterally by means of horizontal needles, would attack it from above by means of vertical needles imparted a vertical reciprocating movement.

What is claimed is:

1. An apparatus for harvesting grapes having diameters from a row of vines each having a stock, the apparatus comprising in combination:

a frame supporting a battery of needles in proximity to the vine with each of the needles substantially parallel to the others;

means for continuously advancing the frame along the row of vines;

the space between the needles being smaller than the diameter of the grapes;

reciprocating means for reciprocating the frame substantially parallel to the longitudinal direction of the needles for imparting a percussion to the grapes;

retractile means operatively connected to each of the needles to make said needle retractable relative to the frame when it encounters a resistance more than a predetermined amount;

receiving means arranged below the needles and organized to collect the grapes;

the frame having a vineward side and a side remote from the vine;

the frame provided with perforations through which the needles penetrate longitudinally whereby each needle has a vineward portion and a portion remote from the vine;

each of the retractile means comprising an elastic member connected between the frame and the portion of its associated needle remote from the vine on the side of the frame remote from the vine;

each of the needles being provided with a stop arranged for engagement of the frame under the urging of said elastic member.

2. The apparatus of claim 1 with:

each needle depending from the frame by means of an elastic collar;

the retractile means comprising an elastic wire connected between the needle and the frame whereby the needle becomes retractable relative the frame when it encounters a resistance more than a predetermined amount.

3. An apparatus for harvesting grapes having diameters from a row of vines each having a stock, the apparatus comprising in combination:

a frame supporting a battery of needles in proximity to the vine with each of the needles substantially parallel to the others;

means for continuously advancing the frame along the row of vines;

the space between the needles being smaller than the diameter of the grapes;

reciprocating means for reciprocating the frame substantially parallel to the longitudinal direction of the needles for imparting a percussion to the grapes;

retractile means operatively connected to each of the needles to make said needle retractable relative to the frame when it encounters a resistance more than a predetermined amount;

receiving means arranged below the needles and organized to collect the grapes;

the frame having a vineward side and a side remote from the vine;

the frame provided with perforations through which the needles penetrate longitudinally whereby each needle has a vineward portion and a portion remote from the vine;

each of the retractile means comprising an elastic member connected between the frame and the portion of its associated needle remote from the vine on the side of the frame remote from the vine;

each of the needles being provided with a stop arranged for engagement with the frame under the urging of said elastic member, a grid parallel to the frame on the vineward side thereof and adapted to pass therethrough, the reciprocating means adapted for retracting the needles completely past the grid.

4. The apparatus of claim 3 with each of the needles provided at its vineward end with a rounded tip 5. The apparatus of claim 4 with the reciprocating means comprising a motor connected to said frame by means of connecting rods and a set of double-acting jacks operatively connected therewith and with balancing masses for elimination of vibrations.

6. The apparatus of claim 4 with:

the frame comprising three subframes each capable of being imported with reciprocations which are out of phase with each other;

the three subframes including a central subframe which carries twice the number of needles as each of two other subframes;

said central subframe imparted with a movement in phase opposition with respect to said two other subframes which are driven in phase.

7. The apparatus of claim 5 with:

the receiving means comprising two half receptacles arrangeable each on opposite sides of the stocks of a row;

the half receptacles each having an edge located near the stock and each of the half receptacles provided with an ascending elastic skirt capable of deforming in contact with said stocks and snugly fitting the contours thereof;

each of the half receptacles having a guide shoe for resting against the stocks of the vines of a row to position the two frames;

articulating means connected to the apparatus to suspend the apparatus thereby.

* * * * *